US 9,815,576 B2

(12) United States Patent
Bullard

(10) Patent No.: US 9,815,576 B2
(45) Date of Patent: Nov. 14, 2017

(54) SOLAR REJECTION SYSTEM WITH MOVABLE SUNSHADE

(71) Applicant: RAYTHEON COMPANY, Waltham, MA (US)

(72) Inventor: Andrew L. Bullard, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 196 days.

(21) Appl. No.: 14/799,636

(22) Filed: Jul. 15, 2015

(65) Prior Publication Data
US 2016/0016678 A1 Jan. 21, 2016

Related U.S. Application Data

(60) Provisional application No. 62/025,265, filed on Jul. 16, 2014.

(51) Int. Cl.
B64G 1/54 (2006.01)
B64G 1/66 (2006.01)
(Continued)

(52) U.S. Cl.
CPC ............ B64G 1/546 (2013.01); B64G 1/54 (2013.01); B64G 1/66 (2013.01); B64G 1/503 (2013.01);
(Continued)

(58) Field of Classification Search
CPC . B64G 1/54; B64G 1/546; B64G 1/58; B64G 1/66; G03B 11/04; G03B 11/045
See application file for complete search history.

(56) References Cited

U.S. PATENT DOCUMENTS 4,295,706 A 10/1981 Frost
5,189,554 A 2/1993 Vanasse et al.
(Continued)

FOREIGN PATENT DOCUMENTS

DE 202013011346 U1 1/2014
FR 2776783 A1 1/1999

OTHER PUBLICATIONS

International Search Report and Written Opinion for corresponding application No. PCT/US2015 dated Sep. 29, 2015.
(Continued)

Primary Examiner — Nicholas McFall
(74) Attorney, Agent, or Firm — Renner, Otto, Boisselle & Sklar, LLP

(57) ABSTRACT

A solar rejection system includes an enclosure for housing a sensor, and a movable sunshade. The housing has an opening or aperture for admitting light to the sensor, and the sunshade is moved as needed to prevent harmful solar illumination of the sensor. The sunshade may be a flat panel. The sunshade panel is mounted to a hinge that is located on one side of a large diameter bearing that allows the shade to be rotated around the aperture of the sensor to always prevent the sun from illuminating the aperture. The hinge allows the shade to be tilted to either allow the sensor to see further off axis without obscuration or to block the sun when it moves in front of the sensor. Full closure of the sunshade on its hinge allows it to also function as an aperture door, blocking the opening or aperture.

16 Claims, 6 Drawing Sheets

(51) Int. Cl.
    *B64G 1/50*          (2006.01)
    *B64G 1/58*          (2006.01)
    *G03B 11/04*        (2006.01)

(52) U.S. Cl.
    CPC ............... *B64G 1/506* (2013.01); *B64G 1/58* (2013.01); *G03B 11/045* (2013.01)

(56) References Cited

U.S. PATENT DOCUMENTS

| | | | |
|---|---|---|---|
| 5,716,030 A * | 2/1998 | LaFiandra | B64G 1/66 244/129.4 |
| 6,199,988 B1 | 3/2001 | Krawczyk | |
| 7,166,825 B1 | 1/2007 | Smith et al. | |
| 8,186,628 B2 | 5/2012 | Gooden et al. | |
| 2004/0201896 A1 | 10/2004 | Lundgren et al. | |
| 2009/0065647 A1 | 3/2009 | Alis et al. | |
| 2011/0037003 A1* | 2/2011 | Gooden | B64G 1/54 250/515.1 |

OTHER PUBLICATIONS

Forman, Steven E., "Advanced Land Imager: Mechanical Design, Integration, and Testing," Lincoln Laboratory Journal, 2005, pp. 181-196, vol. No. 15, Issue No. 2, Massachusetts Institute of Technology.

* cited by examiner

SOLAR REJECTION SYSTEM WITH MOVABLE SUNSHADE

This application claims the benefit under 35 USC 119 of U.S. Provisional Application 62/025,265, filed Jul. 16, 2014, which is incorporated by reference herein in its entirety.

BACKGROUND OF THE INVENTION

Space sensors, particularly optical sensors, have thermally and optically sensitive components that must be protected from direct and often even indirect solar illumination to function. Pointing sensors (line-of-sight is steered independent of the space vehicle) require a moving sunshade over their solar exclusion angle, the minimum angle between the line-of-sight and the sensor-sun vector, to protect the sensors from solar illumination.

Several sunshade designs exist and the two most common are to either (a) connect the sunshade to the instrument being steered to wrap around the light entering the sensor regardless of where the sensor points, or (b) fix the sunshade to the space vehicle and make it wide enough and long enough to provide the necessary solar protection without blocking the light entering the sensor. These two approaches have limitations, particularly the second approach which fundamentally cannot provide an equivalent solar exclusion angle because it does not steer with the sensor. In the case of systems using a pointing "head" mirror, there is no way to move a rigid sunshade in a way that follows sensor line-of-sight without it either blocking the light reflecting off the mirror into the sensor or leaving an exposed gap between the pointing mirror and sensor at some point in its travel. Therefore, when using a pointing head mirror simply accepting the reduction in solar exclusion angle has always been the option chosen, also at the expense of a very large and heavy fixed sunshade.

FIGS. 1 and 2 illustrate one prior approach, a system 100 with a traditional tubular sunshade/baffle 102 being used to protect a gimbaled optical sensor 104. The sensor 104 is partly in an enclosure 106 that can be tilted relative to a spacecraft structure 108 in two directions. The enclosure 106 (along with the fixedly-attached tubular sunshade 102) can be rotated about both a gimbal azimuth axis 112 and a gimbal elevation axis 114. The inside of the baffle 102 is prone to heating and/or light reflection. In addition the system 100 is limited by the solar exclusion angle inherent in the baffle 102, in that the baffle 102 does not allow use of the sensor 104 when the sun 116 is within a certain angle 118 of the direction in which the baffle 102 is oriented. Increasing the size of the baffle 102 to reduce this angle can cause problems in terms of the reducing the field of view of the sensor 104 and in requiring more space and more material for the system. In addition, with reference to FIG. 2, moving the baffle 102 relative to the enclosure 106 can result in a gap 120 in the enclosure 106, which cannot be blocked with the baffle 102.

Another example of a prior solar shade for space-based sensors are those disclosed in U.S. Pat. No. 8,186,628, one embodiment of which is shown in FIG. 3. FIG. 3 shows a shade system 200 that includes an elongate curved portion 202 that extends from a base 204, and a visor 206 that is pivotally coupled to a distal end of the base 204. The base 204 may be moved azimuthally to block solar radiation at most times, with the visor 206 moved into place to block the sun when the sun is at the edge of the field of view of the sensor, such as when the sun is along the edge of a target, such as the Earth. Heating of the curved portion 202 is also a potential problem for this sort of shade.

SUMMARY OF THE INVENTION

In contrast with prior approaches, a solar rejection system uses a separate two-axis mechanism to steer a sunshade, which could simply be a flat panel, about a rotation axis aligned to the center of the sensor's field of regard to always locate itself between the sun and the sensor aperture, and also tilt it about a hinge axis perpendicular to the outer rotation axis to move the sunshade toward or away from the light path entering the sensor. Thanks to its two-axis motion the shade can "hug" the sensor line-of-sight as needed to provide excellent solar exclusion, comparable or better than what's achievable with the steered tubular sunshade approach. Furthermore, it does not collect light on its "inside" surfaces (usually painted black to suppress stray light) and therefore does not heat up the way most sunshades do. Because the shade is hinged it can be closed completely and also function as an aperture dust cover during launch or other contaminating events such as firing thrusters. The door can have calibration features incorporated such that when closed it can be rotated about its azimuth axis to steer a diffuser towards the sun for example.

According to aspect(s) of the invention, a solar rejection system includes: an enclosure with an opening or aperture; and a movable sunshade movable to block solar radiation from entering the opening. The system may include one or more of the following features (individually or in any combination): the sunshade is a flat panel; the sunshade is movable in at least two dimensions; the sunshade is rotatable about at least two axes; the sunshade is rotatable about an axis aligned with a center of regard of a sensor that is in the enclosure; the sunshade is also rotatable about an axis that is perpendicular to the axis aligned with the center of regard of the sensor; the sunshade is hingedly coupled to change elevation angle of the sunshade relative to the enclosure; the sunshade is coupled to a bearing, to enable rotation of the sunshade; the bearing extends around the opening; the sunshade rotates azimuthally along with part of the bearing; the sunshade is hingedly coupled to the bearing; the sunshade has a larger area than an area of the opening; the sunshade may be tilted to fully close the opening, for example to protect a sensor within the enclosure, or to prevent dust or other contaminants from entering the opening; a sensor is located within the enclosure; the sensor includes a two-axis pointing mirror; the two-axis pointing mirror is within the enclosure; the sunshade is fully able to block direct and other undesired illumination of the aperture, regardless of the relative positions of the enclosure and the sun; the sunshade has a length (extent away from a hinge to which the sunshade is coupled) that is greater than a distance between the hinge and the enclosure; the sunshade has a length (an extent away from a hinge to which the sunshade is coupled) that is greater than a greatest extent of the aperture; the sunshade is rectangular; and/or the sunshade has a length (an extent away from a hinge to which the sunshade is coupled) that is greater than a width (an extent in the direction of the hinge axis of rotation).

According to other aspect(s) of the invention, a method of blocking solar illumination of a sensor in an enclosure includes positioning the sunshade of the system of any paragraph in this summary (any permutation) to prevent solar illumination of the sensor, adjusting azimuth and/or elevation as necessary.

According to still other aspect(s) of the invention, a method of protecting a sensor in an enclosure includes positioning the sunshade of the system of any paragraph in this summary (any permutation) to close the aperture or opening of the enclosure.

According to an aspect of the invention, a solar rejection system includes: an enclosure with an aperture; and a movable sunshade movable to selectively block solar radiation from entering the aperture. The sunshade is rotatable relative to the enclosure about at least two axes. The at least two axes include an elevation axis for changing an elevation angle of the sunshade relative to the enclosure. The sunshade has a greatest extent that is larger than a distance between the elevation axis and the enclosure.

According to an embodiment of the system of any previous paragraph(s), the at least two axes include an azimuth axis aligned with a center of regard of a sensor that is in the enclosure.

According to an embodiment of the system of any previous paragraph(s), the azimuth axis is aligned with a center of the aperture.

According to an embodiment of the system of any previous paragraph(s), the sunshade is a flat panel.

According to an embodiment of the system of any previous paragraph(s), the sunshade is coupled to a bearing, to enable rotation of the sunshade along with the bearing.

According to an embodiment of the system of any previous paragraph(s), the sunshade is hingedly coupled to the bearing.

According to an embodiment of the system of any previous paragraph(s), the sunshade has a length, an extent away from wherein the sunshade is hingedly coupled to the bearing, that is greater than a greatest extent of the aperture.

According to an embodiment of the system of any previous paragraph(s), the sunshade has a length, an extent away from wherein the sunshade is hingedly coupled to the bearing, that is greater than a width of the sunshade that is perpendicular to the length.

According to an embodiment of the system of any previous paragraph(s), the sunshade has a larger area than an area of the aperture.

According to an embodiment of the system of any previous paragraph(s), the sunshade is movable to fully close the aperture.

According to an embodiment of the system of any previous paragraph(s), the sunshade is tiltable to fully close the aperture.

According to an embodiment of the system of any previous paragraph(s), the solar rejection system is part of a spacecraft that also includes a sensor that is in the enclosure.

According to another aspect of the invention, a solar rejection system includes: an enclosure with an aperture; and a movable sunshade movable to selectively block solar radiation from entering the aperture. The sunshade is rotatable relative to the enclosure about at least two axes. The sunshade is movable to fully close the aperture.

According to an embodiment of the system of any previous paragraph(s), the at least two axes include an azimuth axis aligned with a center of regard of a sensor that is in the enclosure, and an elevation axis.

According to an embodiment of the system of any previous paragraph(s), the sunshade is a flat panel.

According to an embodiment of the system of any previous paragraph(s), the sunshade is coupled to a bearing, to enable rotation of the sunshade along with the bearing.

According to an embodiment of the system of any previous paragraph(s), the sunshade is hingedly coupled to the bearing.

According to an embodiment of the system of any previous paragraph(s), the sunshade has a length, an extent away from wherein the sunshade is hingedly coupled to the bearing, that is greater than a greatest extent of the aperture.

According to an embodiment of the system of any previous paragraph(s), the solar rejection system is part of a spacecraft that also includes a sensor that is in the enclosure.

According to a further aspect of the invention, a method of protecting a sensor of a spacecraft from damage includes the steps of: moving the sunshade from a stowed position in which the sunshade closes off an aperture in an enclosure of the spacecraft through which the sensor receives light; pointing the sensor at a target; and while the sensor is pointed at the target, positioning a sunshade relative to the enclosure, by rotating the sunshade as a single unit about an azimuth axis and an elevation axis, to prevent sunlight from reaching the sensor through the aperture of the enclosure.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings and/or other materials, which are not necessarily to scale, show various aspects of the invention, and/or various aspects of prior systems.

DETAILED DESCRIPTION

A solar rejection system includes an enclosure for housing a sensor, and a movable sunshade. The housing has an opening or aperture for admitting light to the sensor, and the sunshade is moved as needed to prevent harmful solar illumination of the sensor. The sunshade may be a flat panel. The sunshade panel is mounted to a hinge that is located on one side of a large diameter bearing that allows the shade to be rotated around the aperture of the sensor to always prevent the sun from illuminating the aperture. The hinge allows the shade to be tilted to either allow the sensor to see further off axis without obscuration or to block the sun when it moves in front of the sensor. Full closure of the sunshade on its hinge allows it to also function as an aperture door, blocking the opening or aperture.

Figure 4:
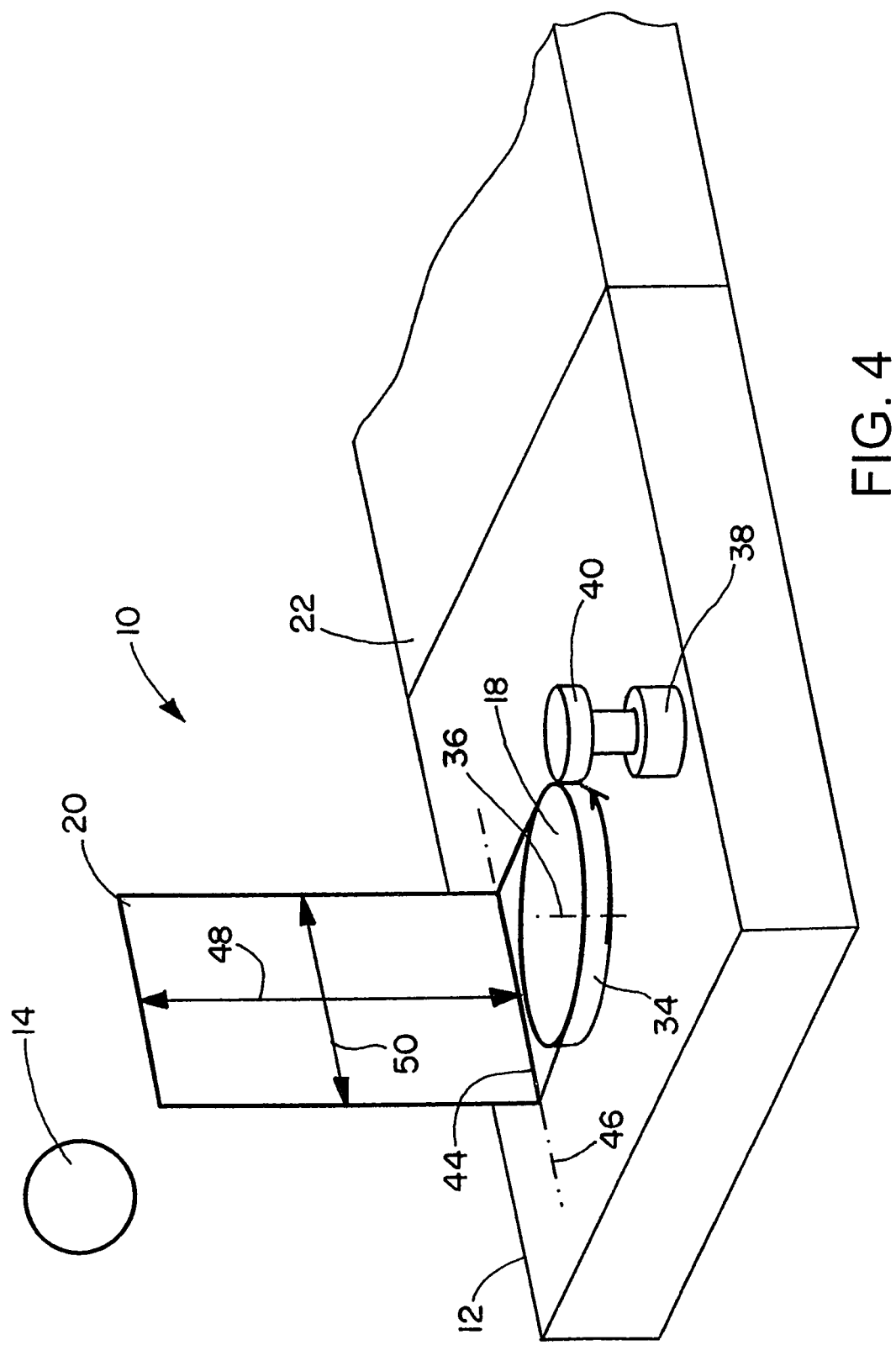
FIG. 4 is an oblique representation of a solar rejection system in accordance with an embodiment of the invention.
Figure 5:
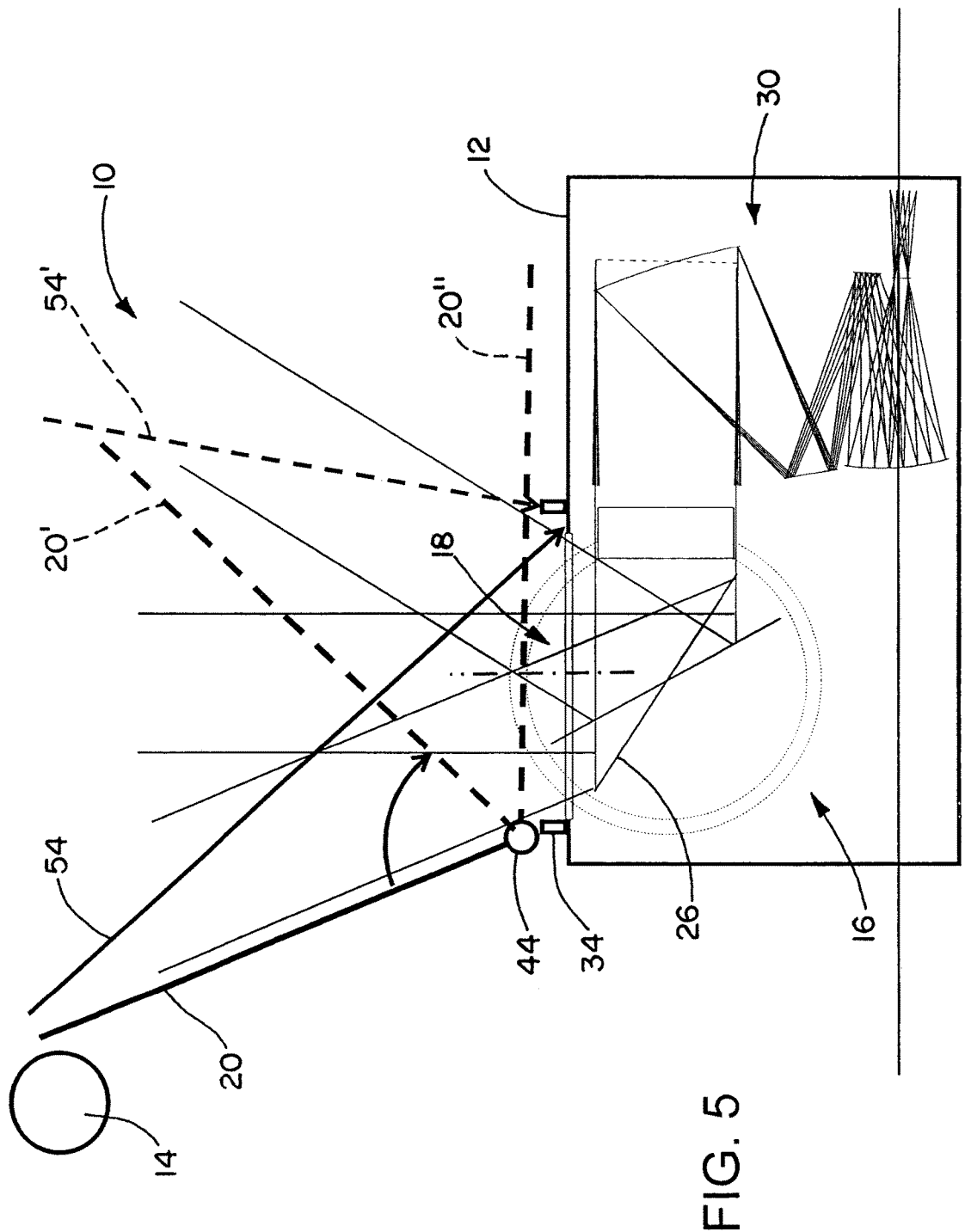
FIG. 5 is a side sectional view of the system of FIG. 4.

Referring to FIGS. 4 and 5, a solar rejection system 10 includes an enclosure 12 that contains a sensor 16 to be protected from direct solar illumination (and/or other harmful solar illumination) from the sun 14. The enclosure 12 has an opening or aperture 18 for admitting some desired light to the sensor 16, and a movable sunshade 20 for blocking undesirable light (such as solar illumination) from reaching the sensor 16. The enclosure 12 is a rigid enclosure, such as a rectangular box, that seals out all light that does not enter through the aperture 18. The enclosure 12 may be made of any of a variety of suitable materials, such as aluminum, steel, other metals, or rigid non-metal materials, such as composites or plastics. The enclosure 12, as well as the other parts of the system 10, may be parts of a spacecraft 22, such as a satellite.

The sensor 16 may have a two-axis pointing mirror 26 to steer the sensor line of sight relative to a space vehicle of which the system 10 is a part. The sensor 16 is able to receive light through the aperture 18 of the enclosure 12 over a range of possible sensor orientation angle, by changing the direction that the mirror 26 points. (The pointing mirror 26 is depicted in the figures as a straight line that is able to tilt to change position, with the mirror 26 directing incoming light over a range of angles to other optics 30 of the sensor 16, such as lenses and/or curved focusing mirrors, which reflect and focus the incoming light.)

The sunshade 20 is a flat panel that is able to rotate in two directions. Azimuth adjustment is provided by a large bearing 34 to which the sunshade 20 is hingedly coupled. In the illustrated embodiment the azimuth bearing 34 extends around the aperture 18 in the enclosure 12. An azimuth axis 36 about which the bearing 34 rotates may be aligned with the sensor's field of regard. A motor or other suitable device may be used to rotate the sunshade and part of the bearing, relative to the enclosure. For example, a motor 38 may turn a drive gear 40 that engages a toothed outer surface of the bearing 34, such that turning the drive gear 40 rotates the bearing 34 about the axis 36.

Elevation adjustment is provided by rotation about a hinge 44 coupling the sunshade 20 to the bearing 34 (or equivalently to a casing or housing that encloses and moves with the bearing 34). The elevation angle may be changed using a motor or other suitable device for effecting positioning of the sunshade 20 about the hinge 44, rotating the sunshade about an elevation axis 46 that passes through the hinge 44.

The sunshade 20 may be positioned so that the azimuth angle is adjusted to always maintain the sunshade 20 between the sensor 16 and the sun. The elevation or tilt may then be adjusted to move the sunshade 20 toward or away from the solar light path, as needed, to prevent solar light from entering the aperture 18 and the sensor 16. One advantage of this sort of adjustment is that the sunshade 20 may be tilted fully out of the way of the sensor's field of view unless there is a need to block incoming solar light. This allows the sensor 16 a maximum possible field of view. The sunshade 20 may also selectively be tilted as much as necessary to fully block direct sunlight from ever reaching the aperture 18, and thus from ever reaching the sensor 16 that is housed in the enclosure 12.

The sunshade 20 may be advantageously hingedly coupled close to the enclosure 12. For example, the sunshade 20 may have a length 48 (an extent away from the hinge 44) that is greater than a distance between the hinge 44 and the enclosure 12, with the sunshade length 48 for example being at least twice that of the distance between the hinge 44 and the enclosure 12, at least five times that of the distance between the hinge 44 and the enclosure 12, or at least ten times that of the distance between the hinge 44 and the enclosure 12.

The aperture 16 may be circular or have another suitable shape. The sunshade length 48 preferably is greater than the greatest extent of the aperture 18 in any direction. The sunshade length 48 may be at least 50% greater than the greatest extent of the aperture 18, or may be at least twice the greatest extent of the aperture 18.

The sunshade 20 preferably has an area that is greater than an area of the aperture 18. The sunshade area may be at least 50% greater than the area of the aperture 18, or may be at least twice the area of the aperture 18. It may be that substantially all of the blockage of the solar light by movable parts of the system 10 is provided by the hinged sunshade 20.

The sunshade 20 has been described and shown as a flat panel. A flat sunshade has the advantage of not directing reflected light inward toward the aperture. Since a flat sunshade does not direct light inward, there may be no need to paint inside surface of the sunshade black. This may help prevent heating up of the sunshade. However, as an alternative the sunshade may have a curved shape.

Also the sunshade 20, regardless of its shape, may have an inner surface, the surface facing toward the aperture 18 when the sunshade 20 is moved to wholly or partially cover the aperture 18, that is painted black or is otherwise treated to absorb light and/or reduce reflection of light. This control of light reflection properties may be for nonvisible as well as visible wavelengths of light.

The sunshade 20 may be rectangular. The sunshade length 48 may be greater than a sunshade width 50 (an extent in the direction of the hinge axis of rotation). Alternatively, the sunshade 20 may have other shapes and/or other relationships between its dimensions.

The parts of the system may be made of suitable materials, such as suitable metals, plastics, or composite materials.

The hinged connection allows the sunshade 20 to be fully closed, to fully overlap and block off the aperture 18. This allows the sunshade 20 to function as a protecting cover when the sensor 16 is not in use. It may also be used to protect the sensor 16 from dust or other contaminants, which might otherwise enter the enclosure through the aperture 18. For example, the sunshade 20 may be used to fully block off the aperture 18 during launch or firing of thrusters.

FIG. 5 shows that the range of movement of the sunshade 20 allows the elevation angle of the sunshade 20 to be selected so as to prevent direct sunlight from ever entering the aperture 18. The sunshade 20 still permits operation of the sensor 16 everywhere within the solar exclusion angle. With the sun 14 positioned as shown, the sunshade 20 may be positioned as shown in solid line, to prevent sunlight 54 from reaching the aperture 18. For a different position of the sun, such as producing sunlight 54' in a different direction, the sunshade may be moved to position 20'. The sunshade may also be place in a stowed position 20" to fully cover the aperture 18.

Figure 6:
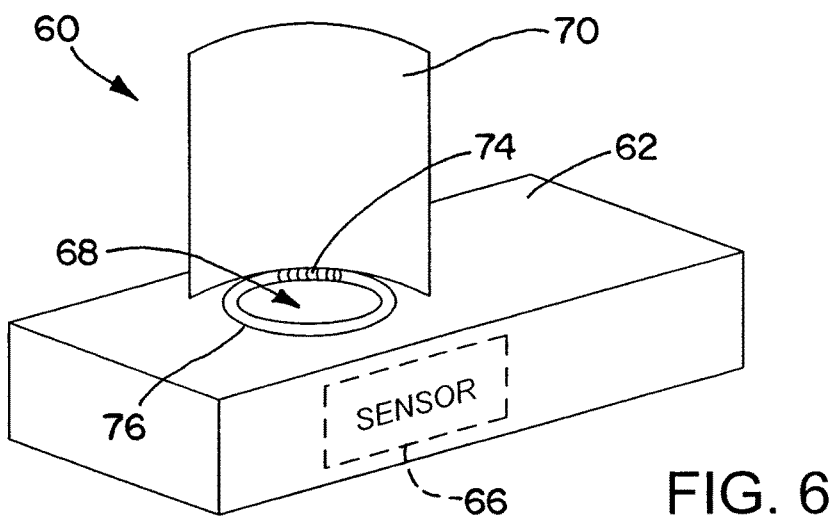
FIG. 6 is an oblique view of a solar rejection system in accordance with another embodiment of the invention.

FIG. 6 shows an alternative embodiment solar rejection system 60 that includes a sunshade 70 for protecting a sensor 66 that is in an enclosure 62 from direct illumination. The sunshade 70 is curved, and may be a portion of a cylinder. The curved shape of the sunshade 70 may provide an advantage of improved stiffness relative to a flat sunshade such as the sunshade 20 (FIG. 1).

The sunshade 70 is coupled to the enclosure at a hinge 74, which may be in or near an aperture 68 in the enclosure 62 that is surrounded by a bearing 76. The sunshade 70 is able to be positioned by rotating it in two directions, adjusting its azimuth and elevation.

Figure 1:
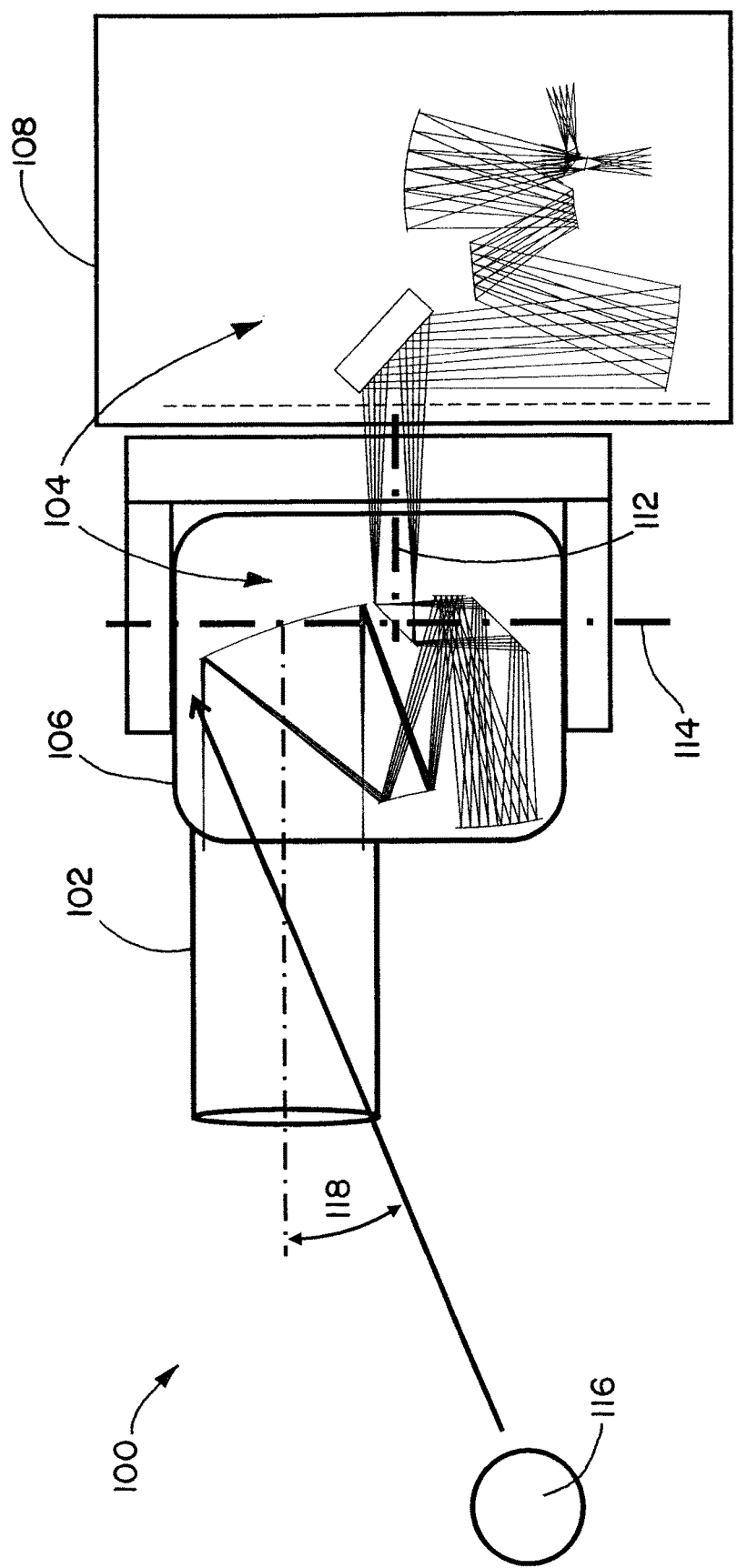
FIG. 1 is a schematic side view of a prior art solar shade system.
Figure 2:
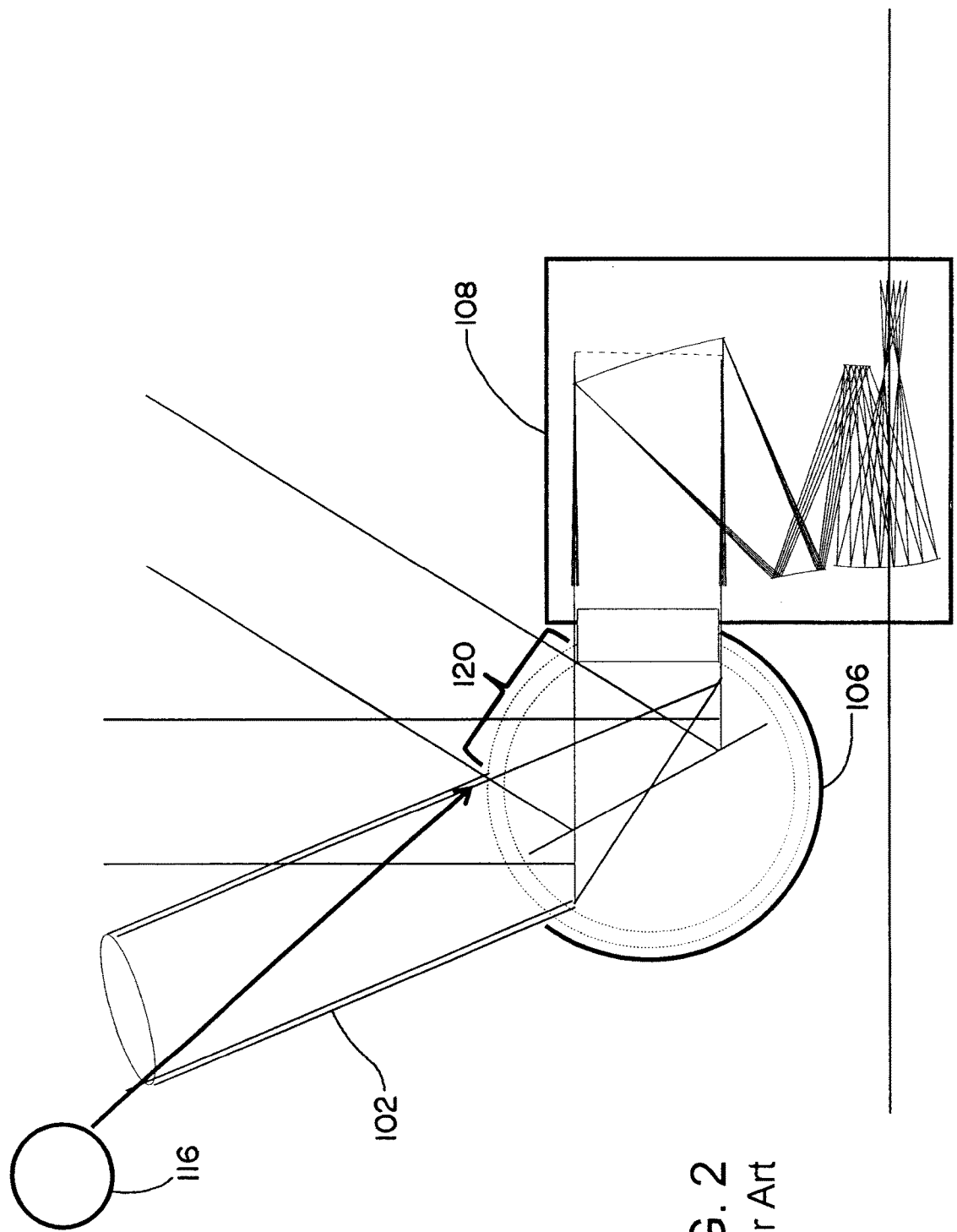
FIG. 2 is a schematic view illustrating operation of the system of FIG. 1.
Figure 3:
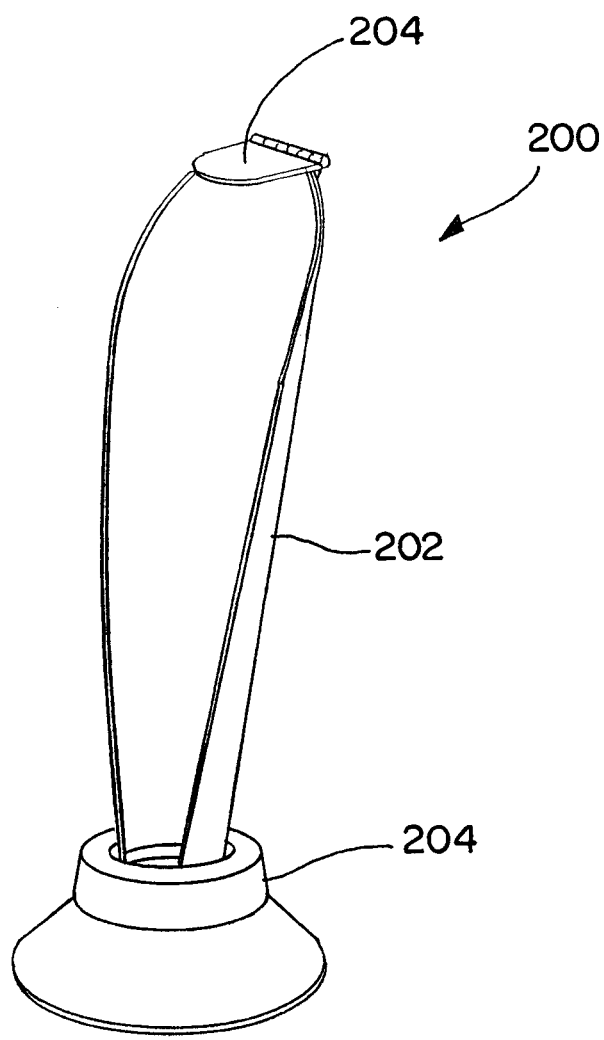
FIG. 3 is an oblique view of another prior art solar shade system.

In addition, the sensor 66 may have a fixed field of view, as opposed to the sensor 16 (FIG. 1) described above, which has the two-axis pointing mirror 26 (FIG. 1). As another alternative, the sensor 66 may have only a single-axis pointing mirror. All of the various configurations for the sensor 16 and 66 may be used in conjunction with flat or curved sunshades.

Figure 7:
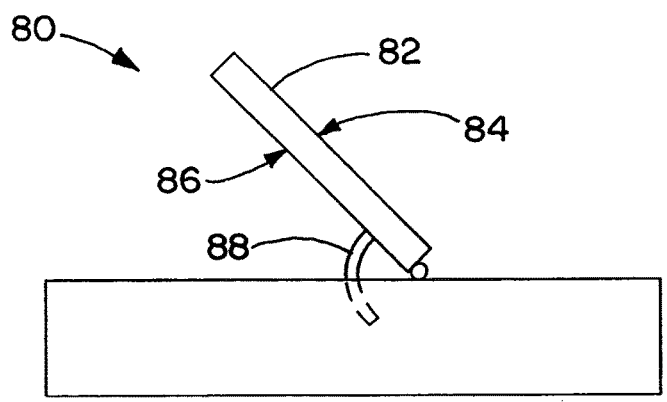
FIG. 7 is a schematic view of a solar rejection system in accordance with yet another embodiment of the invention.
Figure 8:
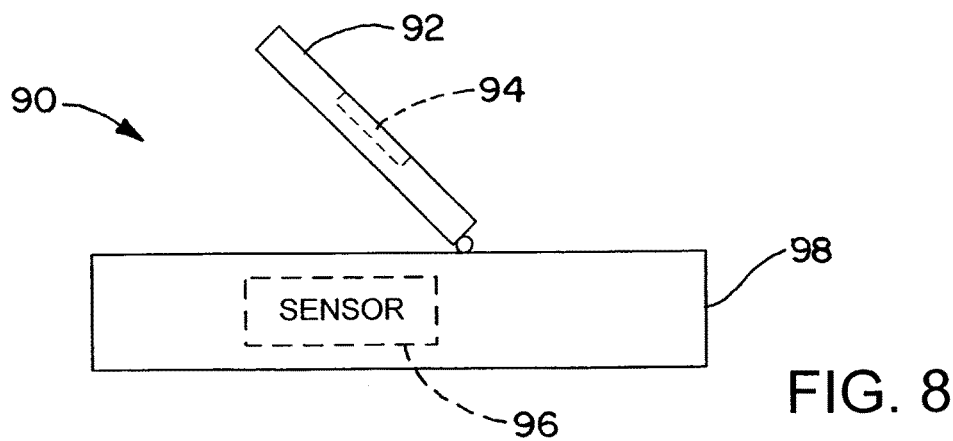
FIG. 8 is a schematic view of a solar rejection system in accordance with still another embodiment of the invention.

FIGS. 7 and 8 show additional embodiments with additional features. The features shown in these additional embodiments may be combined in any combination with each other and with the features in the other embodiments described above.

FIG. 7 shows a schematic view of a solar rejection system 80 in which a positionable sunshade 82 is also used as heat rejection device. An outside surface 84 of the sunshade 82, the side that faces toward the sun, is covered with a thermal insulating material, such as a multi-layer thermal insulating material. An inside surface 86 of the sunshade 82, the side that faces away from the sun, has a surface configured to radiate heat. The inside surface could be painted black, for example, to enhance heat radiation. Alternatively or in addition, the sunshade 82 could have heat transfer devices such as heat pipes built into it, to transport heat along the sunshade 82 from a base of the sunshade 82, for example. A thermal connection 88, such as a heat strap or heat pipe, may be used to thermally couple a heat source (providing waste heat to be dissipated) to the sunshade 82. The heat to be dissipated may come from any of a variety of sources within the vehicle of which the sunshade 80 is a part.

FIG. 8 shows a variant in which a sunshade 92 of a solar rejection system 90 includes on its outer surface a light transmitting portion 94 that provides some light to the sensor 96 within an enclosure 98 (or to another sensor). The light-transmitting portion 94 coupled be a series of pinholes, a diffuser, and/or a reflector. The portion 94 could be used, for instance to calibrate the sensor 96 when the sunshade 92 is closed, with the sun shining on the closed sunshade 92. In such a situation the sensor 96 may be unusable for normal operation, because of the position of the sun, but calibration could still be carried out at this time. A baffle (not shown) could be moved into place to block light from coming through the light transmitting portion 94 when the sunshade 92 is opened to provide light to the sensor 96 through an aperture in the enclosure 98.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A solar rejection system comprising:
   an enclosure with an aperture; and
   a movable sunshade movable to selectively block solar radiation from entering the aperture;
   wherein the sunshade is rotatable relative to the enclosure about at least two axes;
   wherein the at least two axes include an elevation axis for changing an elevation angle of the sunshade relative to the enclosure;
   wherein the sunshade has a greatest extent that is larger than a distance between the elevation axis and the enclosure;
   wherein the at least two axes include an azimuth axis aligned with a center of regard of a sensor that is in the enclosure;
   wherein the sunshade is coupled to a bearing, to enable rotation of the sunshade along with the bearing; and
   wherein the sunshade is hingedly coupled to the bearing.

2. The solar rejection system of claim 1, wherein the azimuth axis is aligned with a center of the aperture.

3. The solar rejection system of claim 1, wherein the sunshade is a flat panel.

4. The solar rejection system of claim 1, wherein the sunshade has a length, an extent away from where the sunshade is hingedly coupled to the bearing, that is greater than a greatest extent of the aperture.

5. The solar rejection system of claim 1, wherein the sunshade has a length, an extent away from where the sunshade is hingedly coupled to the bearing, that is greater than a width of the sunshade that is perpendicular to the length.

6. The solar rejection system of claim 1, wherein the sunshade has a larger area than an area of the aperture.

7. The solar rejection system of claim 1, wherein the sunshade is movable to fully close the aperture.

8. The solar rejection system of claim 1, wherein the sunshade is tiltable to fully close the aperture.

9. The solar rejection system of claim 1, wherein the solar rejection system is part of a spacecraft that also includes a sensor that is in the enclosure.

10. A solar rejection system comprising:
    an enclosure with an aperture; and
    a movable sunshade movable to selectively block solar radiation from entering the aperture;
    wherein the sunshade is rotatable relative to the enclosure about at least two axes;
    wherein the sunshade is movable to fully close the aperture; and
    wherein the at least two axes include an azimuth axis aligned with a center of regard of a sensor that is in the enclosure, and an elevation axis.

11. The solar rejection system of claim 10, wherein the sunshade is a flat panel.

12. The solar rejection system of claim 10, wherein the sunshade is coupled to a bearing, to enable rotation of the sunshade along with the bearing.

13. The solar rejection system of claim 12, wherein the sunshade is hingedly coupled to the bearing.

14. The solar rejection system of claim 13, wherein the sunshade has a length, an extent away from where the sunshade is hingedly coupled to the bearing, that is greater than a greatest extent of the aperture.

15. The solar rejection system of claim 10, wherein the solar rejection system is part of a spacecraft that also includes a sensor that is in the enclosure.

16. A method of protecting a sensor of a spacecraft from damage, the method comprising:
- moving a sunshade from a stowed position in which the sunshade closes off an aperture in an enclosure of the spacecraft through which the sensor receives light;
- pointing the sensor at a target; and
- while the sensor is pointed at the target, positioning the sunshade relative to the enclosure, by rotating the sunshade as a single unit about an azimuth axis and an elevation axis, to prevent sunlight from reaching the sensor through the aperture of the enclosure.

* * * * *